US012802514B2

(12) United States Patent
Molinaro et al.

(10) Patent No.: US 12,802,514 B2
(45) Date of Patent: Nov. 17, 2026

(54) VENDING MACHINE FOR COFFEE-BASED BEVERAGE

(71) Applicant: Luigi Lavazza S.p.A., Turin (IT)

(72) Inventors: Gabriele Molinaro, Turin (IT); Denis Rotta, Atri (IT); Leonardo Sergio, Turin (IT); Carlo De Mango, Turin (IT)

(73) Assignee: LUIGI LAVAZZA S.P.A., Turin (IT)

( * ) Notice: Subject to any disclaimer, the term of this patent is extended or adjusted under 35 U.S.C. 154(b) by 343 days.

(21) Appl. No.: 18/263,845

(22) PCT Filed: Jan. 25, 2022

(86) PCT No.: PCT/IB2022/050621
§ 371 (c)(1),
(2) Date: Aug. 1, 2023

(87) PCT Pub. No.: WO2022/167895
PCT Pub. Date: Aug. 11, 2022

(65) Prior Publication Data

US 2024/0312286 A1 Sep. 19, 2024

(30) Foreign Application Priority Data

Feb. 2, 2021 (IT) ........................ 102021000002150

(51) Int. Cl.
*G07F 13/00* (2006.01)
*A47J 31/42* (2006.01)
(Continued)

(52) U.S. Cl.
CPC ............ *G07F 13/065* (2013.01); *A47J 31/42* (2013.01); *A47J 42/50* (2013.01); *A47J 42/54* (2013.01)

(58) Field of Classification Search
CPC ......... G07F 13/065; A47J 31/42; A47J 42/50; A47J 42/54
See application file for complete search history.

(56) References Cited

U.S. PATENT DOCUMENTS

2003/0155101 A1* 8/2003 Minney ................ A47J 31/401 165/58
2015/0027315 A1* 1/2015 Lussi ...................... A47J 31/42 99/289 R (Continued)

FOREIGN PATENT DOCUMENTS

CN 107207092 A 9/2017
CN 109091003 A 12/2018

(Continued)

OTHER PUBLICATIONS

International Search Report and Written Opinion of the ISA for PCT/IB2022/050621 mailed Apr. 8, 2022, 13 pages.

*Primary Examiner* — Adnan M Mirza
(74) *Attorney, Agent, or Firm* — Nixon & Vanderhye P.C.; Lars H. Genieser

(57) ABSTRACT

A vending machine comprises a cabinet (2) in which there are housed: —a storage volume (10), for containing coffee beans (CB), —a grinder (11), designed to grind coffee beans (CB) coming from the storage volume (10), —a brewing unit (12), designed to receive an amount of ground coffee (GC) coming from the grinder (11), —a supply arrangement (13), configured for supplying an extraction fluid (HW) to the brewing unit (12), —a dispensing arrangement (14) of a coffee-based beverage (EC), set downstream of an outlet (12*a*) of the brewing unit (12), —at least a part of a cooling arrangement, configured for cooling the coffee beans (CB) contained in the storage volume (10). The storage volume (10) comprises an inner container (40)), for receiving and storing the coffee beans (CB), and the cooling arrangement (Continued)

comprises a first outer casing (41) which at least partially surrounds the inner container (40)), between the inner container (40) and the first outer casing (41) at least a part of a first gap (42) being defined, having at least one inlet (42*a*) and at least one outlet (42*b*). The cooling arrangement further includes a refrigeration unit (20), having at least a first outlet (18) for a flow of cooled air, connected via at least one first delivery duct (CA) to the at least one inlet (42*a*) of the first gap (42), and at least one first inlet (29) for a flow of air to be cooled, connected via at least a first return duct (WA) to the at least an outlet (42*b*) of the first gap (42).

19 Claims, 7 Drawing Sheets

(51) Int. Cl.

| | |
|---|---|
| ***A47J 42/50*** | (2006.01) |
| ***A47J 42/54*** | (2006.01) |
| ***G07F 13/06*** | (2006.01) |

(56) References Cited

U.S. PATENT DOCUMENTS

| | | | | |
|---|---|---|---|---|
| 2016/0316970 | A1* | 11/2016 | Ryan | A47J 42/40 |
| 2016/0353905 | A1* | 12/2016 | Resch | A47F 3/0447 |
| 2017/0370630 | A1 | 12/2017 | Klassen et al. | |
| 2018/0362320 | A1 | 12/2018 | Wong | |
| 2020/0248935 | A1 | 8/2020 | Born et al. | |
| 2020/0375388 | A1* | 12/2020 | MacFarlane | G06Q 20/3224 |
| 2021/0093120 | A1 | 4/2021 | Palmer et al. | |

FOREIGN PATENT DOCUMENTS

| | | | | |
|---|---|---|---|---|
| CN | 209371625 | U | 9/2019 | |
| CN | 111520947 | A | 8/2020 | |
| CN | 111770711 | A | 10/2020 | |
| EP | 2281469 | A1 * | 2/2011 | A23F 5/04 |
| WO | 2010020929 | A1 | 2/2010 | |

* cited by examiner

VENDING MACHINE FOR COFFEE-BASED BEVERAGE

This application is the U.S. national phase of International Application No. PCT/IB2022/050621 filed Jan. 25, 2022, which designated the U.S. and claims priority to IT 102021000002150 filed Feb. 2, 2021, the entire contents of each of which are hereby incorporated by reference.

TECHNICAL FIELD

The present invention refers in general to vending machines, in particular of the type intended to be installed in communities, such as workplaces or health facilities, or in open places, such as railway stations. The invention has been developed with particular attention being paid to vending machines intended to dispense at least coffee-based beverages in cup containers, typically cups supplied by the same vending machine.

STATE OF THE ART

Vending machines of the indicated type are widely known. Some of these vending machines are designed for preparing on spot coffee-based beverages—such as an espresso coffee—starting from coffee beans.

For this purpose, inside a cabinet of the vending machine the various components or functional units are housed, that allow to obtain the beverage and which typically comprise:

- a storage volume, usually consisting of a hopper container, for containing the coffee beans;
- a grinder, set downstream of an outlet of the storage volume, designed to grind coffee beans from the storage volume;
- a brewing unit, set downstream of an outlet of the grinder, designed to receive an amount of ground coffee from the grinder, this amount being usually dosed by the same grinder (grinder-doser);
- a supply arrangement, configured for supplying an extraction fluid, such as hot water, to the brewing unit, this arrangement generally including a water source (such as a drinking water tank, or a connection to an external drinking water network) and a boiler;
- a dispensing arrangement of the coffee-based beverage, set downstream of an outlet of the brewing unit, typically including a nozzle that dispenses the beverage at a suitable pick-up area outside the cabinet of the vending machine.

Clearly, the vending machine preferably includes other functional elements or units, such as one or more storage volumes of other beverage precursors (as those schematized in 10' in FIG. 1), or a store configured for the storage of cups and the selective positioning thereof at the aforementioned pick-up area, a control system including a control unit, etc., which are not, however, of immediate interest for the understanding of the problems underlying the invention.

In the vending machines of this type, following the request from a user, entered via a suitable user interface, the grinder grinds a certain amount of coffee beans coming from the storage volume, in order to produce a dose of ground coffee that is fed to the brewing unit, to which a certain amount of hot water is also fed via the supply arrangement. The brewing unit prepares the beverage through the interaction between the dose of ground coffee and the hot water, with this beverage that—through the dispensing arrangement—is supplied outside the vending machine cabinet.

The environment in which the vending machine is installed can assume high values of temperature, and possibly of humidity. Think of a vending machine installed outdoors, for example in a railway station, where the summer environmental temperature can attain values above 30° C. Consider also that various internal electrical components of the vending machine—such as one or more motors or the boiler for heating water—are themselves a source of heat. In such circumstances, inside the vending machine cabinet, a temperature of 40-50° C. can be easily reached, as well as significant humidity rate, even above 60%.

These particularly severe conditions inside the vending machine cabinet adversely affect the quality of the raw material of the beverage, for example, due to oxidative phenomena and loss of volatiles, which occur when the coffee beans are exposed to high levels of temperatures and humidity. This deterioration of the coffee beans evidently brings about a deterioration of the quality of the dispensed beverage, for example in the taste thereof. Similar problems may also occur in relation to other beverage precursors, for example precursors already in granular or powdery form, such as soluble preparations or preparations for infusions.

It should be noted that some automatic machines for household use are equipped with a container for the storage of coffee beans, as well as of a grinder, for operating in a way substantially similar to that described above. DE 101 47 284 A discloses one such automatic machine for household use, equipped with an arrangement for cooling the storage container of the coffee beans and the grinder. The cooling arrangement consists of a series of Peltier elements and the machine is designed in such a way that, just before the start of a grinding process, the Peltier cells are activated until the coffee beans are cooled to a predetermined temperature, between −25 and −40° C. This prior solution ensures that the grinding process takes place at a temperature at which the taste of the coffee beans is guaranteed to be maintained. However, this solution does not appear suitable for use in a vending machine of the type indicated above, in particular when intended for use in open places, also for reasons of low heat exchange efficiency.

AIM AND SUMMARY

In its general terms, the present invention aims to obtain a vending machine of the type indicated at the beginning, able to efficiently solve the drawback indicated above, tied to the possible existence of a high temperature and/or humidity inside the cabinet of the vending machine.

This aim is attained, according to the invention, by a vending machine having the characteristics indicated in the attached claims. The claims form an integral part of the technical teaching provided herein in relation to the invention.

BRIEF DESCRIPTION OF THE DRAWINGS

Further aims, characteristics and advantages of the invention will result from the following description, made with reference to the attached drawings, provided by way of non-limiting example only, wherein.

DESCRIPTION OF PREFERRED EMBODIMENTS

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment, "in various embodiments", and the like, that may be present in different points of this description, do not necessarily refer to one and the same embodiment. Furthermore, particular conformations, structures, or characteristics defined in the framework of the present description may be combined in any adequate way in one or more embodiments, that may even differ from the ones represented. The reference numbers and spatial references (such as "upper", "lower" "top", "bottom", etc.) used herein are merely for convenience and hence do not define the sphere of protection or the scope of the embodiments. The same reference numbers are used in the figures to indicate similar or technically equivalent elements.

Figure 1:
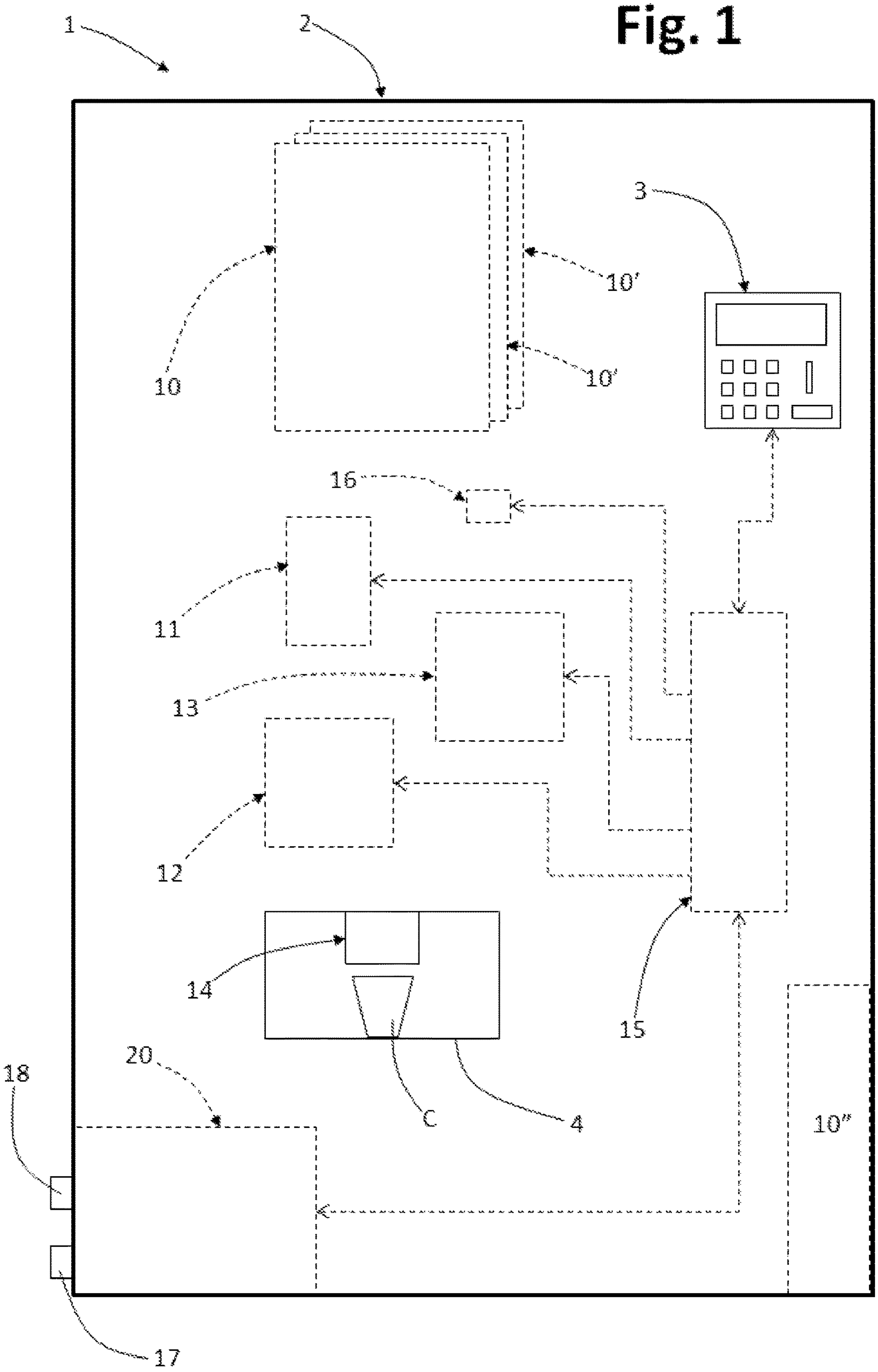
FIG. 1 is a schematic representation of a vending machine according to possible embodiments of the invention.

Referring initially to FIG. 1, reference 1 indicates as a whole a vending machine, in particular of the type designed to be installed in communities, such as workplaces or health facilities, or in open places, such as railway stations. The vending machine 1 is configured to dispense at least coffee-based beverages, not excluding with this that the machine can be configured—in a way known in itself—to provide other food products in solid form, preferably packaged products (for example brioches or snacks), and/or other types of beverages (for example tea, or milk, or similar), in particular beverages obtainable from soluble precursors.

The vending machine 1 comprises a cabinet 2, for example having a substantially parallelepiped shape, preferably having a metal supporting structure, possibly completed with plastic panels. Preferably, at least one side of the cabinet 2 comprises or obtain a door, in order to allow access to the inside of the cabinet itself. In various embodiments, at a front of the cabinet 2, a user interface 3 is provided, through which a user can set the request for a product that can be dispensed by the vending machine 1. This interface 3 may comprise, for example, a display and a set of selection keys, as well as a possible payment device, comprising for example a slot for introduction of coins and/or a system for introduction of banknotes and/or a socket for inserting an electronic payment key and/or an electronic contactless payment system.

Preferably, always at the front of cabinet 2, at least one pick-up area 4 for the products dispensable by the vending machine is defined. This pick-up area 4 may comprise, for example, a space defined at the front of cabinet 2, which is accessible from outside the cabinet itself. In preferential embodiments of the invention, the vending machine 1 comprises inside a store for the storage of cups, for example cups made of plastic or paper material, and a handling system for placing in advance a single cup C at the pick-up area 4, to receive a beverage that have to be dispensed. The aforementioned store and the corresponding cup positioning system are not tied to the purposes of the invention and can be obtained in any ways known per se in the field.

Inside the cabinet 2 various components or functional units are housed, that enable to obtain a coffee-based beverage, for example, an espresso coffee. With 10 a storage volume is indicated, for containing coffee beans. With 11 a grinder 11 is indicated, configured to grind coffee beans fed by the volume 10; the design and the way of operation of the grinder 11 can be of any known type, the grinder being preferably configured, or having associated a system, for the dosage at input of a dosed amount of coffee beans, or else for the dosage at output of a predefined amount of ground coffee. Reference 12 designates a brewing unit, also of a known conception, prearranged for receiving the aforementioned amount of ground coffee from the grinder 11, dosed by the grinder itself or by the associated dosing system. With 13 a known supply arrangement is indicated, prearranged for feeding an extraction fluid to the brewing unit 12.

In view of preparing the coffee-based beverage, e.g., an espresso coffee, the extraction fluid may be hot water, and for this purpose the arrangement 13 comprises, for example, a source of drinking water, such as a tank that can be periodically topped-up, as well as a device for heating the water to be supplied to the brewing unit 12, for example, a known electric boiler. To this end, the arrangement 13 preferably also includes means for dosing the water to be delivered to the brewing unit 12, comprising for example a volumetric meter (such as an impeller meter) and at least one solenoid valve. Note that the drinking water source may include a supply network outside the cabinet 2, in which case the arrangement 13 includes a suitable connection to such an external network, preferably equipped with a water filter and/or a descaling and/or softener system.

With 14 a dispensing arrangement is indicated, to which the coffee-based beverage is supplied from the brewing unit 12. The dispensing arrangement 14 may comprise, for example, a duct ending with a nozzle, to dispense the beverage in the cup C previously placed at the pick-up zone 4.

Reference 15 designates a control unit of the vending machine 1, comprising for example an electronic control board which manages in a known manner operation of various functional elements or units of the vending machine, also on the basis of commands or signals received from other elements of the machine, such as the user interface 3, the aforementioned volumetric meter of the supply arrangement 13, and at least one temperature sensor 16 which is arranged inside the cabinet 2 and which is also in signal communication with the unit 15; the function of this sensor will be described below.

In various preferential embodiments, inside the cabinet 2 is also at least a part of a cooling arrangement, configured to cool the coffee beans contained in the storage volume 10. In accordance with a characteristic of the invention, the cooling arrangement includes a refrigeration unit, indicated with 20 as a whole. In various preferential embodiments, the refrigeration unit 20 is arranged in the lower portion of the cabinet 2, in particular anchored at a base of the cabinet, for the reasons explained below.

Figure 2:
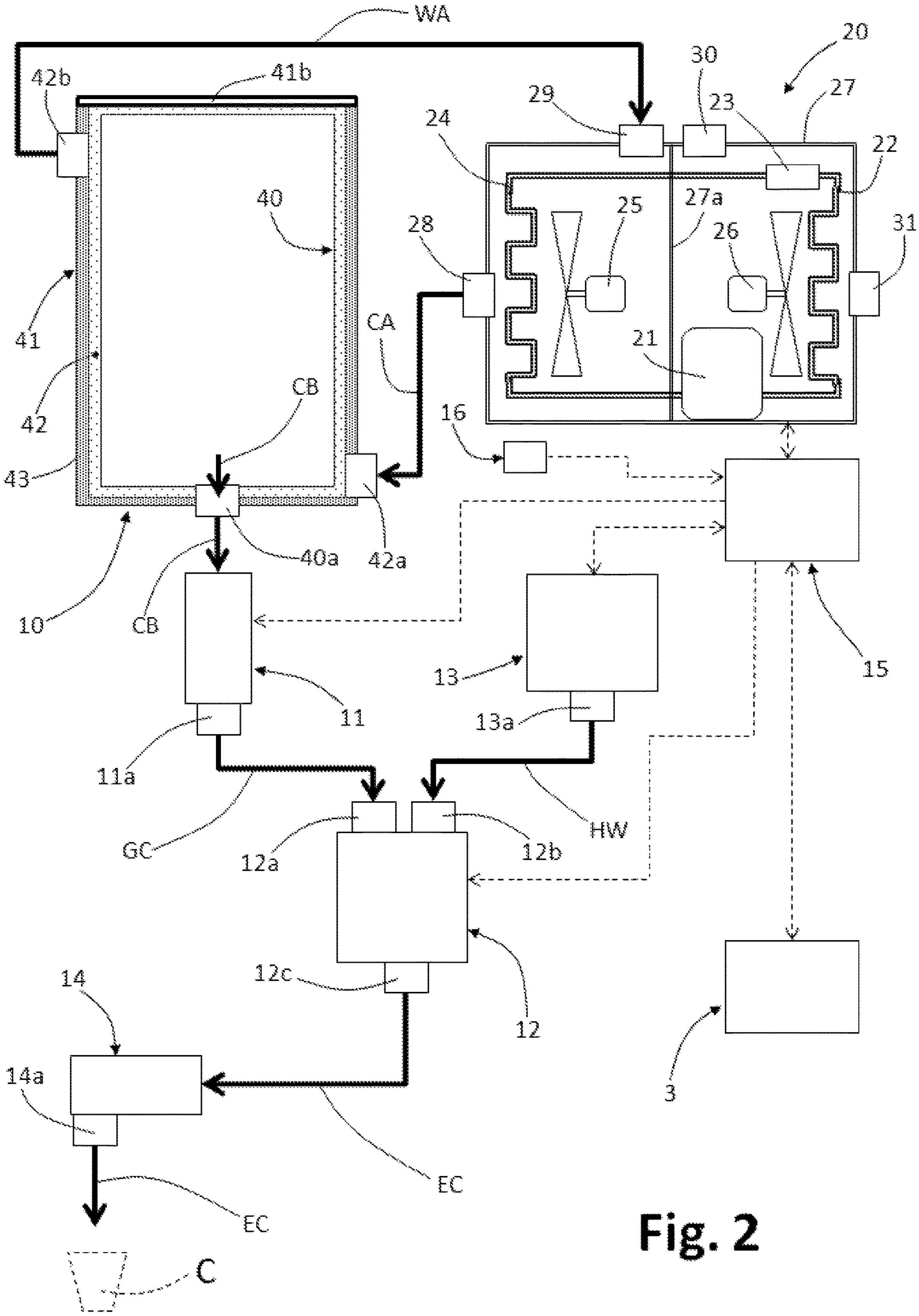
FIG. 2 is a schematic representation of some internal elements of a vending machine according to possible embodiments of the invention.

Referring to FIG. 2—wherein only the elements useful for the purpose of understanding the invention are shown—following the request by a user, set through the user interface 3, the grinder 11 grinds a certain amount of coffee beans—schematized by the arrows CB—coming from a lower outlet 40*a* of the storage volume 10, in order to supply a dose of ground coffee-schematized by the arrow GC—which is fed to the brewing unit 12, for example via a relative inlet 12*a*. To a second inlet 12*b* of the unit 12 a certain amount of hot water is fed, schematized by the arrow HW, via the supply arrangement 13 (in FIG. 2, reference 13*a* can be meant as the outlet of the boiler for water heating). The brewing unit 12 prepares the beverage through the interaction between the dose of ground coffee GC and the amount of hot water HW. The coffee-based beverage—schematized by the arrows EC—comes out of an outlet 12*c* of the unit 12 and, through the dispensing arrangement 14, is supplied outside the cabinet of the vending machine (in FIG. 2, reference 14*a* can be meant as the nozzle for dispensing the coffee-based beverage).

According to a characteristic of the invention, the storage volume 10 comprises an inner container, designated by 40, for receiving and storing the coffee beans CB. For example, the inner container 40 may consist of a hopper container, preferably but not necessarily of plastic material, having a lower outlet 40*a*, for example a protruding outlet having a substantially cylindrical shape. The container 40 can have a containment volume approximately ranging from 10 to 15 litres. The container 40 could also be a typical sachet of coffee beans, provided with a relatively rigid sleeve to define the outlet 40*a*, or a rigid jar provided with the outlet 40*a*.

Note that in the figures the outlet 40*a* of the container 40 and the grinder 11 are shown spatially separated from one another only for the sake of clarity of the representation. In the practical implementation, however, it is preferable that the outlet 40*a* of the container 40 is fitted or in any case coupled to a corresponding inlet of the grinder 11, that is with the two components 40 and 11 directly adjacent and attached to each other, to constitute a sort of single unit (although the two parts are preferably separable, in order to allow removal of the container 40).

According to a further characteristic of the invention, the cooling arrangement comprises an outer casing, indicated by 41, which surrounds at least partially the container 40, and between the container 40 and the outer casing 41 a gap is defined, indicated by 42, having at least one inlet 42*a* and at least one outlet 42*b*.

In various embodiments the outer casing 41 has a cross-sectional shape similar to that of the container 40, but larger in size, so as to surround the container 40 at least peripherally, preferably at a distance (without excluding possible areas of mutual contact). Preferably, the casing 41 also has a bottom wall, so that the gap 42 also extends in a position corresponding to the bottom of the container 40; for this purpose, the bottom of the casing 41 can be provided with a lower opening, to enable passage of the outlet 40*a*—if this is a protruding one—and in any case functional connection of the outlet 40*a* to the inlet mouth of the grinder 11.

Preferably, the outer casing 41 comprises a layer of (heat) insulating material 43, particularly on its outer side, in order to minimize possible heat exchange toward the outside and therefore maximize heat exchange toward the inside, i.e., to the coffee beans. In various embodiments, the outer casing 41 is provided with an opening/closing element, such as an openable or removable door or lid, indicated with 41*b*. Element 41*b* is designed for enabling access to the container 40, for the purpose of replacement thereof, or filling thereof with coffee beans; preferably, the opening/closing element 41*b* is also provided with a respective insulation, for the same reasons as indicated above. Note that, in the figures, the door or lid 41*b* is represented in the upper part of casing 41: however, in the practical implementation of the invention, it may be positioned differently, for example at a side of the casing 41.

In various embodiments, such as those exemplified, the container 40 is configured as a container closed above, that is, without aa upper loading mouth: in such embodiments, the container 41 can therefore be conceived as a disposable refill container (for example a sachet or a jar), or as a refillable container, exploiting the outlet 40*a* also for filling the container itself. By contrast, in other embodiments not represented, the container 40 is provided with a loading opening, not necessarily at the top, with an associated opening/closing element, in order to allow the topping up of the coffee beans.

As already indicated, according to a preferential characteristic of the invention, inside the cabinet 2 a refrigeration unit 20 is mounted. Note that FIG. 2 has a schematic character, with the position of the components—such as the unit 20—which is dictated by mere requirements of clarity of representation. For example, as already indicated, in embodiments currently considered as preferential ones, the unit 20 is housed in the lower part of cabinet 2, in particular on its base; the positioning of the unit 20 in the upper part of the cabinet 2 would in fact make it difficult the operations required for topping up or replace the container 40 of the storage volume 10, as well as of any storage volumes 10' of other products (in the practical implementation, the vending machine 1 is preferably also configured for the dispensing of beverages that are not obtained from coffee beans, such as beverages obtained from soluble precursors, such as tea, and/or packaged food products, such as brioches or snacks). The positioning of the unit 20 at the base also reduces generation of significant vibratory phenomena on the cabinet 2, when a compressor of the unit 20 operating.

In various embodiments, the refrigeration unit is of a design and operation known in itself, and may comprise, for example, a compressor 21, a condenser 22, an expansion valve 23 (or a device having similar function) and an evaporator 24. Preferably, the cold side of the unit, i.e., the evaporator 24, has a first electric fan 25 operatively associated thereto; a second electric fan 26 can be operatively associated to the hot side of the unit, i.e., the condenser 22, although this is not strictly necessary in some applications.

In various embodiments, the unit 20 has its own casing 27, within which the corresponding components are positioned, such as the components 21-26. In preferential embodiments, the casing 27 of the unit 20 defines an internal chamber that is divided—for example by means of an intermediate wall 27*a*—into two half-chambers, one housing the condenser 22 and the possible electric fan 36, and the other one housing the evaporator and its electric fan 25. The compressor 21 and the expansion valve 23 are preferably located in the half-chamber of the condenser 22.

In various embodiments, the casing 27 of the refrigeration unit 20 has relatively small dimensions, especially ranging from 350-550 mm (height)×300-400 mm (width)×350-400 mm (depth). The small dimensions of the unit 20 advantageously allow its positioning inside the cabinet 2; however, a positioning of the same unit outside of the cabinet is not excluded from the scope of the invention, for example when it is desired to equip a pre-existing vending machine with a cooling arrangement in accordance with the invention (an example to this effect is given in FIG. 8).

According to a characteristic of the invention, the refrigeration unit 20 has at least one first outlet for a flow of cooled air, connected via at least one first delivery duct to the inlet 42*a* of the gap 42, and at least one first inlet for a flow of air to be cooled, connected via at least one first return duct to the outlet 42*b* of the gap 42. Referring to FIG. 2, the aforementioned outlet and inlet of the unit 20, indicated with 28 and 29, respectively, are at the half-chamber housing the evaporator 24, in positions respectively downstream and upstream of the evaporator itself, having as reference the direction of the air circulation flow. As it can be seen, the outlet 28 is connected via a duct—schematized by the arrow AC—to the inlet 42*a* of the gap 42, while the outlet 42*b* of the gap 42 is connected via a duct—schematized by the arrow WA—to the inlet 29.

In this way it is possible to obtain a circulation of air that crosses the gap, in a substantially closed path. The cold created by the evaporator is transferred to the air, which through the outlet 28 and the duct AC reaches the inlet 42*a* of the gap 42. This cooled air passes through the gap 42, so cooling the inner container 40 and the contents thereof, and takes heat therefrom, and then leaves the gap 42 via the outlet 42*b*, to return to the evaporator 24 via the duct WA and the inlet 29.

In various preferential embodiments implementation, the circulation of the cooled air and of the air to be cooled is a forced circulation, obtainable thanks to the use of an electric fan, such as the fan indicated with 25. In the example, for this purpose, the outlet 28 and the inlet 29 of the unit 20 are in positions respectively downstream and upstream of the electric fan 25, with reference to the direction of the air circulation flow. The electric fan 25 is configured for at least forcing the cooled air into the duct AC, and preferably also to suck the air to be cooled from the duct WA.

Of course, the fluid dynamic characteristics of the air circuit will be chosen in order to ensure that the gap 42 is involved as a whole by the flow of cooled air coming from the duct AC; for example, the sizing (such as the passage section) of the inlets 29, 42*a*, the outlets 28, 42*b*, the gap 42 and the ducts AC, WA will be determined according to the characteristics of the unit 20, for example the flow rate of the electric fan 25.

In various preferential embodiments, the ducts AC and WA are (thermally) insulated ducts, in order to avoid heat losses (cold losses from the duct AC and heat losses from the duct WA).

The proposed mode of ventilated cooling for the containment volume 10, and in particular for the inner container 40, is very efficient from the energy viewpoint, and causes a low humidity, with an ensuing lower risk of condensation at the volume 10, which could contribute to the deterioration of the coffee beans. The fact that the cooled air produced by the unit 20 is not blown directly inside the container 40, or on the coffee beans, avoids damaging the aromatic quality of the product, depriving it of organoleptic peculiarities; direct blowing on the beans, moreover, could cause a deterioration of the product due to the humidity of the cooled air and the condensation that would be generated on the internal walls of the container 40, due to the temperature difference between inside and outside.

In various preferential embodiments, the at least one inlet 42*a* and the at least one outlet 42*b* of the gap 42 are in a lower region and in an upper region, respectively, of the outer casing 41, i.e., of the gap itself. With this solution, the coldest air coming from the duct AC (understood as air that has not yet performed a cooling function) firstly involves the lower area of the container 40 which, as mentioned, is in the immediate vicinity or in contact with the inlet of the grinder 11, in which grinding is usually carried out: in this way it is possible to obtain a cooling by conduction of this grinding area, as explained below.

The operation of the refrigeration unit 20 is preferably controlled by the control unit 15, at least as a function of a temperature that exists within the volume bounded by cabinet 2. This detection of the internal temperature is carried out via the sensor 16, preferably in an area subject to refrigeration by the unit 20: the detected temperature is compared with a pre-set threshold value, for example set when installing distributor 1, to operate the compressor 21 when necessary, and then carry out a typical refrigeration cycle. Preferably, for the purpose of controlling operation of the unit 20, there are also means, in themselves known, to control the temperature at the outlet of the evaporator 24 and to control the compressor 21 with an ON/OFF or PID logic, according to methods widely known in the refrigeration and environmental conditioning field. In various embodiments the aforementioned threshold temperature is greater than 0° C. particularly comprised between +5 and +25° C., preferably between +15 and +20° C., depending on the desired level of preservation of the product; for example, a preferential threshold value is approximately +18° C., which is a temperature suitable for preventing rapid oxidation and/or rancidity of coffee beans and/or ground coffee.

Of course, it is possible to provide the unit 20 with its own control unit, instead of implementing the corresponding control logic on the control unit 15 of the vending machine 1, in which case the sensor 16 will be connected in signal communication with the control unit of the refrigeration unit 20.

In order to exemplify a possible operating cycle of the cooling system, let us assume that:

- the temperature outside the cabinet, on an average summer day in Italy, reaches the value of about 33-34° C.;
- inside the cabinet, due to the presence of heating elements (such as the brewing unit 12 and the boiler of the supply arrangement 13), temperatures on average higher than the external one of about 6-7° C. are detected (therefore an average internal temperature of about 40° C.);
- the pre-set threshold temperature is equal to 18° C.

When, through the sensor 16, a temperature equal to or higher than the threshold temperature of 18° C. is detected inside the cabinet 2, the unit 20 is activated for the production of cooled air. The evaporator 24 then cools the air which, through the electric fan 25 and the outlet 28, is forced into the duct AC, to reach the gap 42 by means of the outlet 42*a*. This cold air, indirectly coming into contact with warmer objects, represented by the container 40 and the beans contained thereinto, heats up as it rises into the gap 42, and then returns to the unit 20 (by means of the outlet 42*b*, the duct WA and the inlet 29), to be cooled again to the desired temperature, and then brought back inside the gap 42. Of course, like any physical system, the desired temperature for cooling the container 40 and its contents CB is reached only after passing an initial thermal transient.

In various embodiments, the at least one temperature sensor 16 is positioned inside the cabinet 2 in the region where the grinder 11 is located, in order to ensure that the unit 20 is activated and deactivated, for the purpose of cold generation, when the temperature in that region is equal to or greater than the pre-set threshold value.

The indicated positioning region of the sensor 16 is considered preferential because, for the purpose of implementing the invention, the grinder 11 can represent a critical point for the optimal preservation of coffee. The grinder 11 is in fact a component that, by its nature, tends to originate heat (both due to the operation of a corresponding electric motor, and due to the action carried out by its grinding blades). At the inlet mouth of the grinder 11—in which, as mentioned, it is preferably directly coupled the outlet 40*a* of the container 40—or in its immediate vicinity it is usually defined the grinding area. In this area there may remain a minimum amount of coffee beans and, above all, following a grinding phase, in this area there generally remains a minimum amount of ground coffee: it has been experimentally found that this residue of coffee powder—if exposed to unsuitable storage conditions—tends to deteriorate very quickly, with a sudden increase in its oxidative state.

For these reasons it is therefore preferable that the temperature measurement according to which the refrigeration unit 20 is controlled takes place in the area of the grinder 11. This obviously does not exclude that, in addition or alternatively, a temperature sensor can be placed in the region of the storage volume 10 (for example inside the gap 42, or in contact with the casing 41—including its door or lid 41*b*—or in contact with the container 40), or at the delivery duct WA.

It should be considered that, in the solution according to the invention, the cooling of the coffee beans is obtained by pure conduction, that is, it is an "indirect" cooling, which avoids the flow of cold air directly on the coffee beans, for the reasons set out above, related for example to the loss of aromatic quality. As a matter of fact, the cooled air circulating in gap 42 cools the walls of the inner container 40, with part of the cold being transferred to the "peripheral" beans and air that are directly in contact with these walls; these "peripheral" grains and air in turn transfer part of the cold to the adjacent beans and air, and so on towards the centre of the container 40.

This cooling mode has the consequence that even any coffee beans remained at the inlet mouth of the grinder 11, and at least part of the grinder itself, are cooled by conduction or natural convention. However, this cooling may not be sufficient for cooling any ground coffee residue that remained in the grinding area of the grinder 11. For this reason, in particularly advantageous embodiments of the invention, the cooling arrangement of the vending machine 1 is configured to cool at least part of the grinder 11.

The at least partial cooling of the grinder 11 can be carried out in a direct and active manner. Possible embodiments of this type are shown in FIGS. 3-7.

Figure 3:
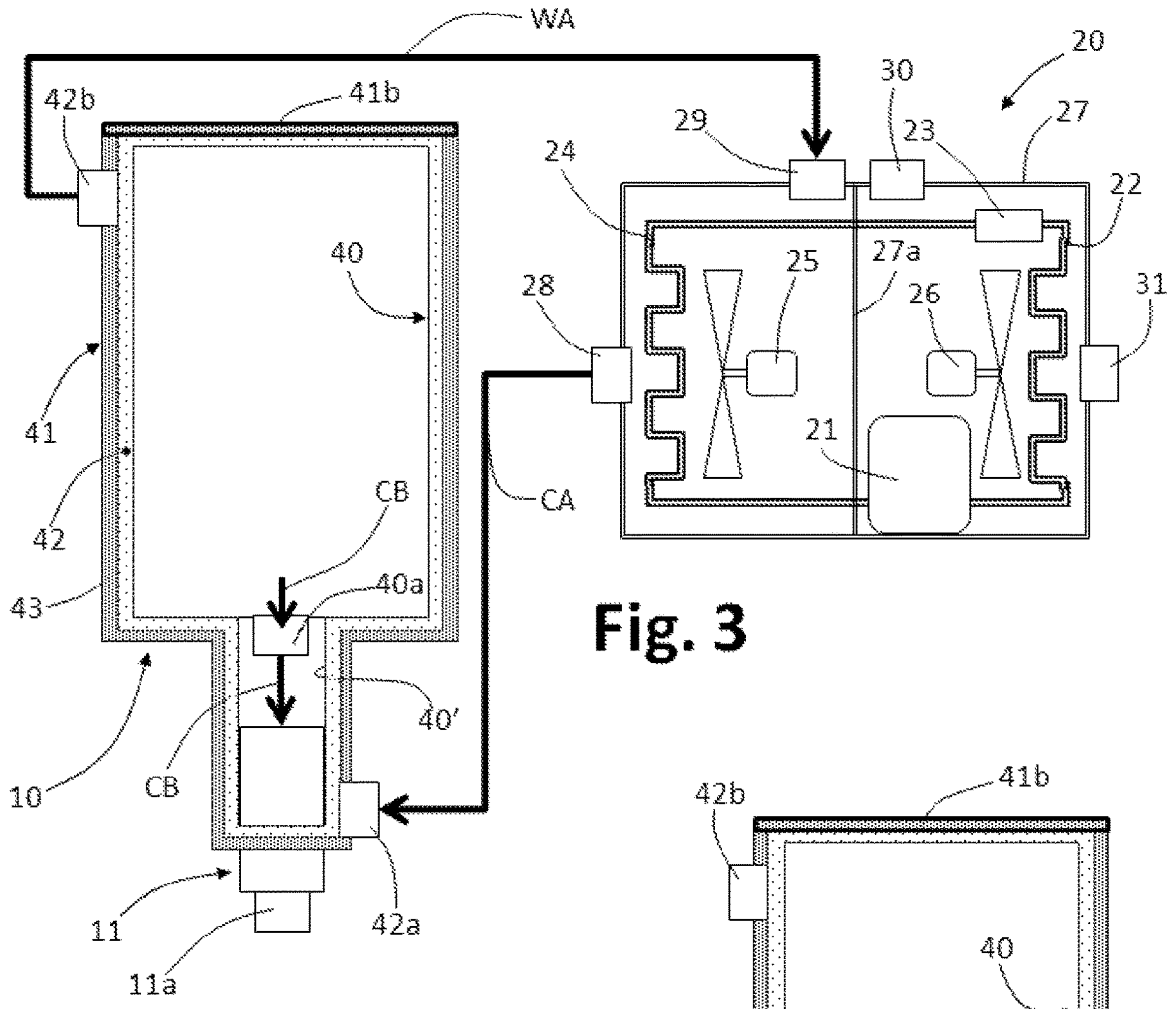
FIGS. 3-7 are schematic representations of some internal elements of a vending machine according to variant embodiments of the invention.

In the case of FIG. 3, the outer casing 42 also partially surrounds the grinder 11. For such a case, for example, an internal jacket 40' can be provided, that at least partially surrounds the grinder 11; this jacket 40' can be configured as a separate component or as a part protruding downward from the bottom of the container 40. The outer casing 41 is shaped to surround the 40' jacket, so that between them a respective part of the gap 42 extends. Also in such a solution the inlet 42*a* is preferably located in the lower part of the gap 42, here the part thereof that at least partially surrounds the grinder 11. As it can be seen, with such a type of solution, the cooled air introduced into the gap 42 allows to maintain at a controlled temperature even at least a part of the grinder 11, preferably a part that includes both the grinding area and the underlying dosage area, in which a residue of ground coffee may be present.

Figure 4:
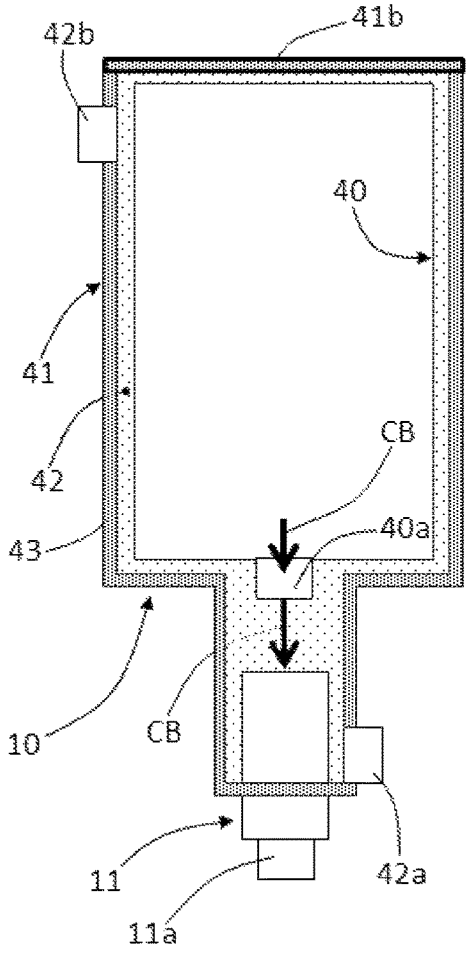

The jacket 40', although preferential, could be omitted, as in the example of FIG. 4, wherein the outer casing 41 is shaped to define a volume in fluid communication with the gap 42, in which the part of interest of the grinder 11 extends.

Of course, it is also possible to provide several inlets 42*a* for the cooled air, for example one at the grinder 11 and one at the lower area of the container 40 (for example in the position shown in FIG. 2), as well as several outlets 42*b*, for example one at the grinder 11 and one at the upper part of the container 40 (for example in the position shown in FIG. 2). Via corresponding ducts, preferably (thermally) insulated, the cooled air can be fed in series (in derivation) or in parallel to the inlets of the gap, and similarly the air to be cooled can be withdrawn in series or in parallel from the outlets of the gap.

Figure 5:
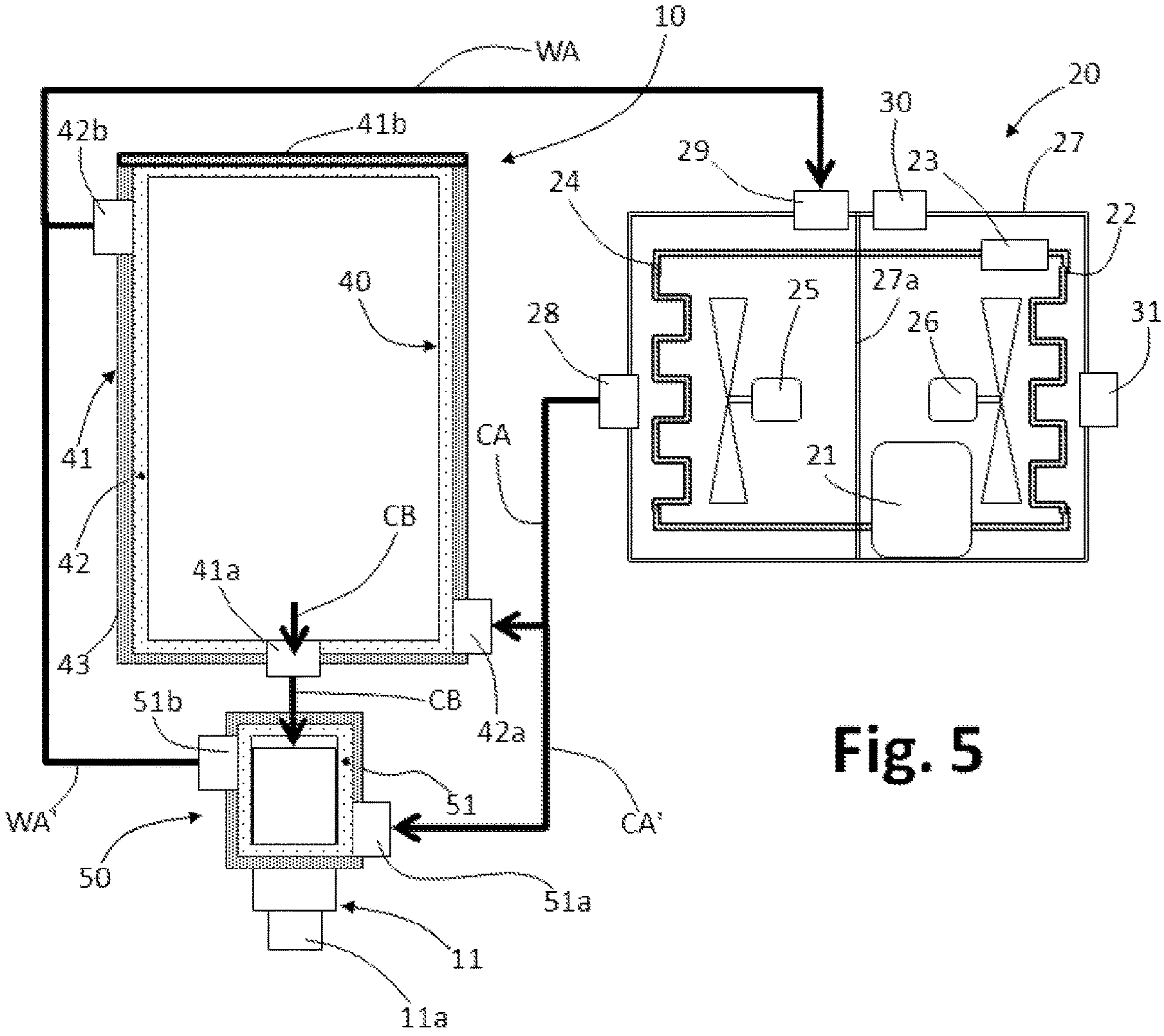
Figure 6:
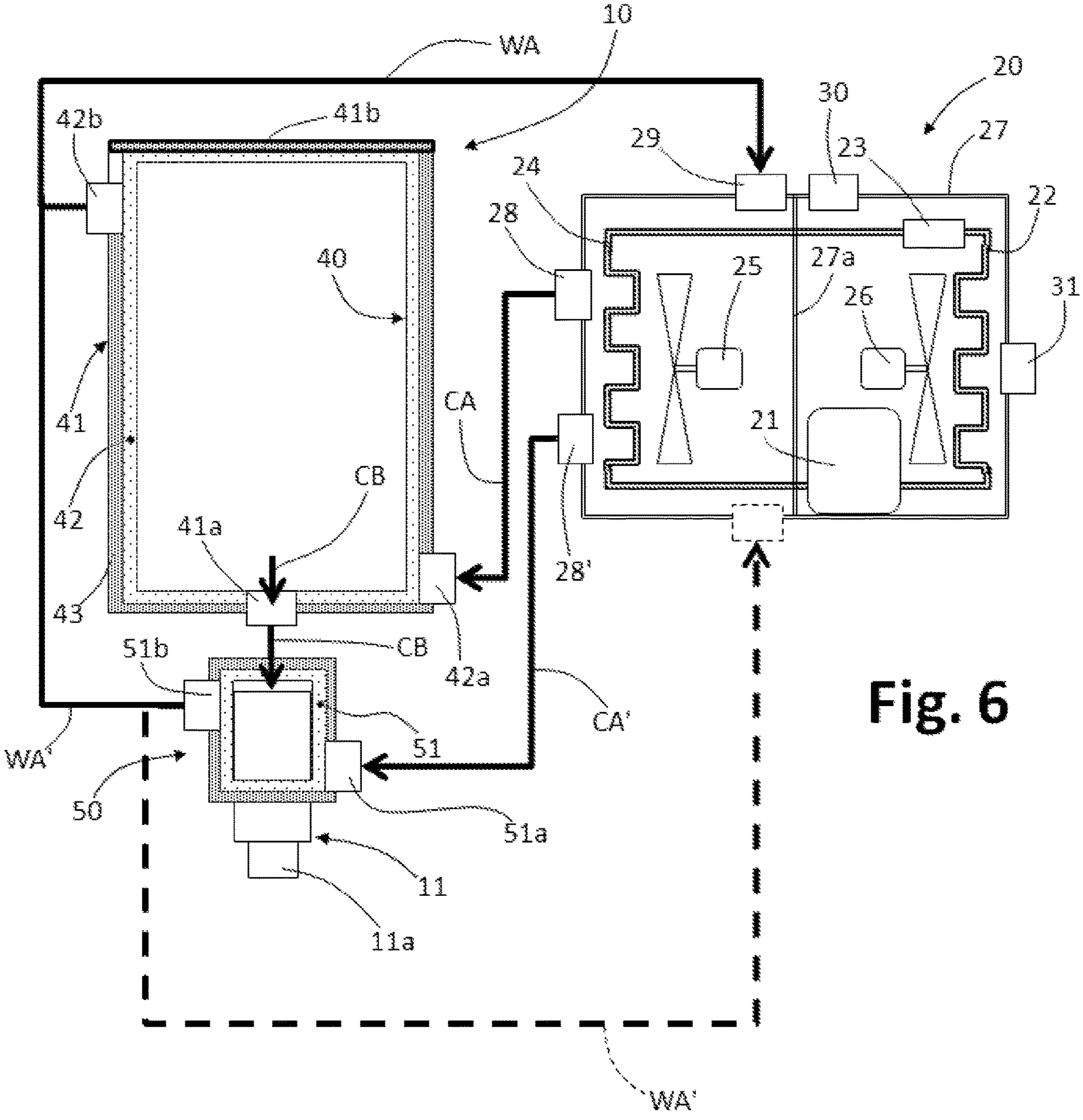

In the case of FIG. 5, the cooling arrangement includes a second casing, designated by 50, which at least partially surrounds the grinder 11 and in which a respective gap 51 is defined, the latter having at least one respective inlet 51*a* and at least one respective outlet 51*b*. In embodiments of this type, the refrigeration unit 20 is configured to force cooled air also at the inlet 51*a*, and to receive air from the outlet 51*b* of the gap 51 to be cooled.

In the case of embodiments of the type shown in FIG. 5, the cooling arrangement comprises a second delivery duct, schematized by the arrow CA', and a second return duct, schematized by the arrow WA', connected to the inlet and the outlet of the gap 51, respectively. These additional ducts CA', WA' are also preferably (thermally) insulated ducts, for the reasons already explained.

In the example in FIG. 5 the delivery duct AC' and the return duct WA' are formed by respective branches of the ducts AC and WA, such that the refrigeration unit 20 can be provided with a single outlet 28 and a single inlet 29, for the circulation of the cooled air and of the air to be cooled. By contrast, in the case of FIG. 6, the refrigeration unit 20 has a second outlet 28' for the cooled air, connected through the delivery duct AC to the inlet of the gap 51, and a single inlet 29 for the air to be cooled, with the ducts WA' and WA connected in series.

In this case, therefore, two flows of cooled air are supplied in parallel to the two gaps 42 and 51, while the flow of air to be cooled coming from the gap 51 is conveyed to the unit 20 together with the flow of air to be cooled coming from the gap 42. Obviously it is also possible to provide the unit with a second inlet 29', to which the duct WA' is directly connected, as schematized by hatching in FIG. 6, in order to fed in parallel the two flows of air to be cooled to the unit 20.

In general, therefore, as an alternative to a parallel connection between the outlets 28, 28' of the unit 20 and the inlets 42*a*, 51*a* of the gaps 42, 51, on the one hand, and between the inlets 29, 29' of the unit 20 and the outlets 42*b*, 51*b* of the gaps 42, 51, on the other hand, also "hybrid" circuit solutions are possible, that is, with:

- one of the delivery duct CA' and the return duct WA' which is formed by a respective branch of the delivery duct CA or the return duct WA, respectively, and
- the other of the delivery duct CA' and the return duct WA' which is connected to a respective outlet 28' or a respective inlet 29', respectively.

Figure 7:
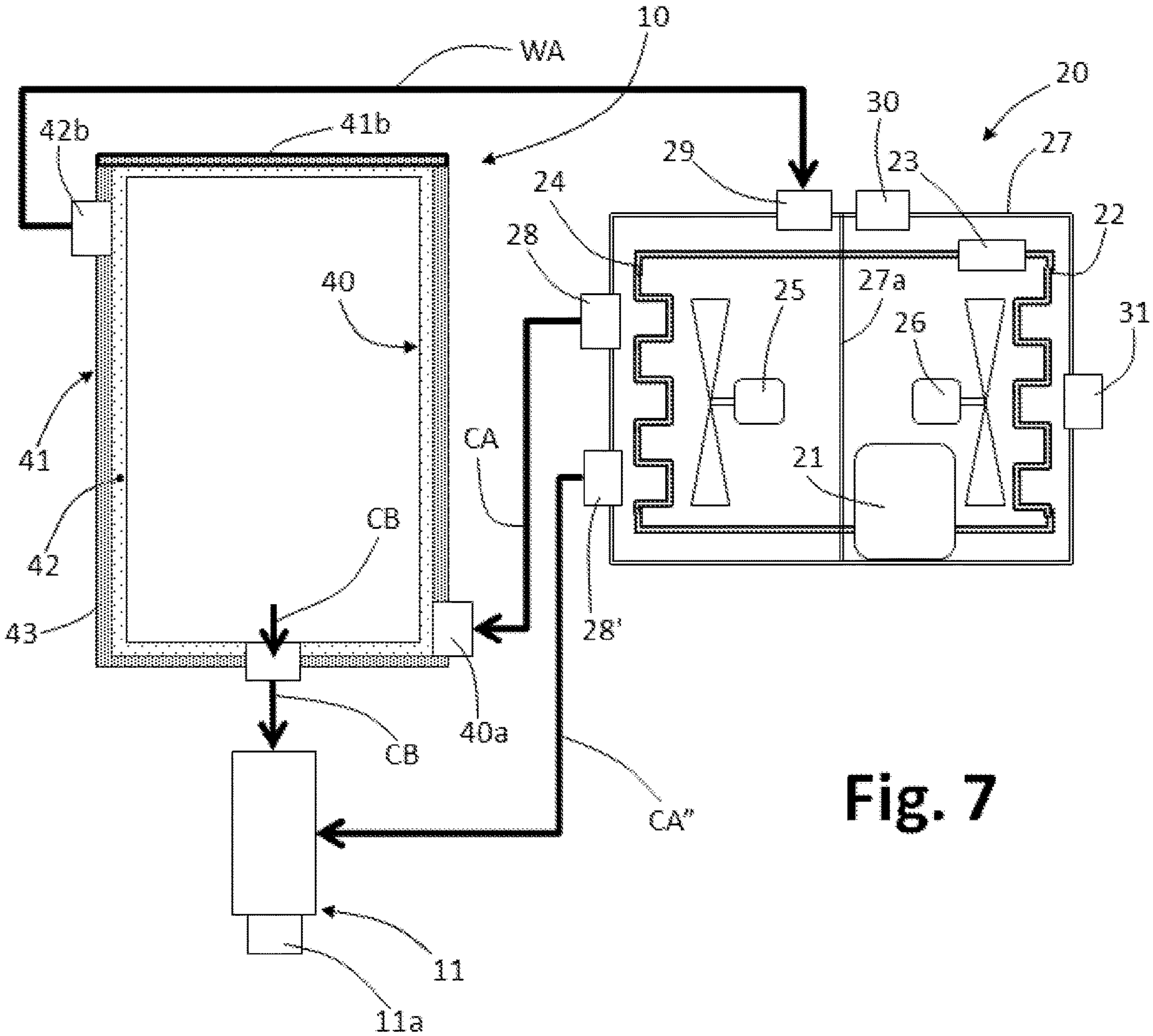

In the variant embodiment of FIG. 7, the cooling arrangement of the vending machine 1 is designed to directly direct a flow of cooled air on at least one part of the grinder 11, i.e., without the mediation of a gap. In the case exemplified, the unit 20 has a second outlet 28' for cooled air that, via a duct schematized by the arrow CA", is blown directly on the grinder 11. A solution of this type can be useful, for example, besides to cool at least part of the grinder 11, also for reducing the overall temperature inside the cabinet 2.

Of course, in relation to the embodiments exemplified with reference to FIGS. 3-7 the above indications apply, in relation to the prearrangement of the fluid dynamic characteristics of the air circuit.

It should also be noted that cabinet 2 is preferably provided with a ventilation inlet and a ventilation outlet, exemplified in 17 and 18 in FIG. 1, for example in the form of slits or gratings, for the disposal of the heat produced by the condenser 22 during operation of the refrigeration unit 20. As mentioned, preferably, the unit 20 can also comprise a second electric fan 26 associated with the condenser 22, for the suction—through the ventilation inlet 17—of air from the environment outside the cabinet 2, for the cooling of the condenser 22, and for the expulsion into the environment outside the cabinet 2—through the ventilation outlet 18—of air that has been heated by the condenser 22.

In the examples shown, the casing 27 of the unit 20 has, particularly at the half-chamber housing the condenser 22, a respective inlet 30 and a respective outlet 31, in positions respectively downstream and upstream of the condenser 22, with reference to the direction of the air circulation flow. This inlet 30 and outlet 31 are connected in fluid communication with the inlet 17 and outlet 18 of the cabinet, respectively, for example directly or through (thermally) insulated ducts. In this way heat dissipation from the unit 20 to the inside of the cabinet 2 can be reduced.

The characteristics of the present invention are clear from the above description, as are its advantages. It is clear that numerous variants are possible for the person skilled in the art to the vending machine described as an example, without departing from the scope of the invention as defined by the claims that follow.

Figure 8:
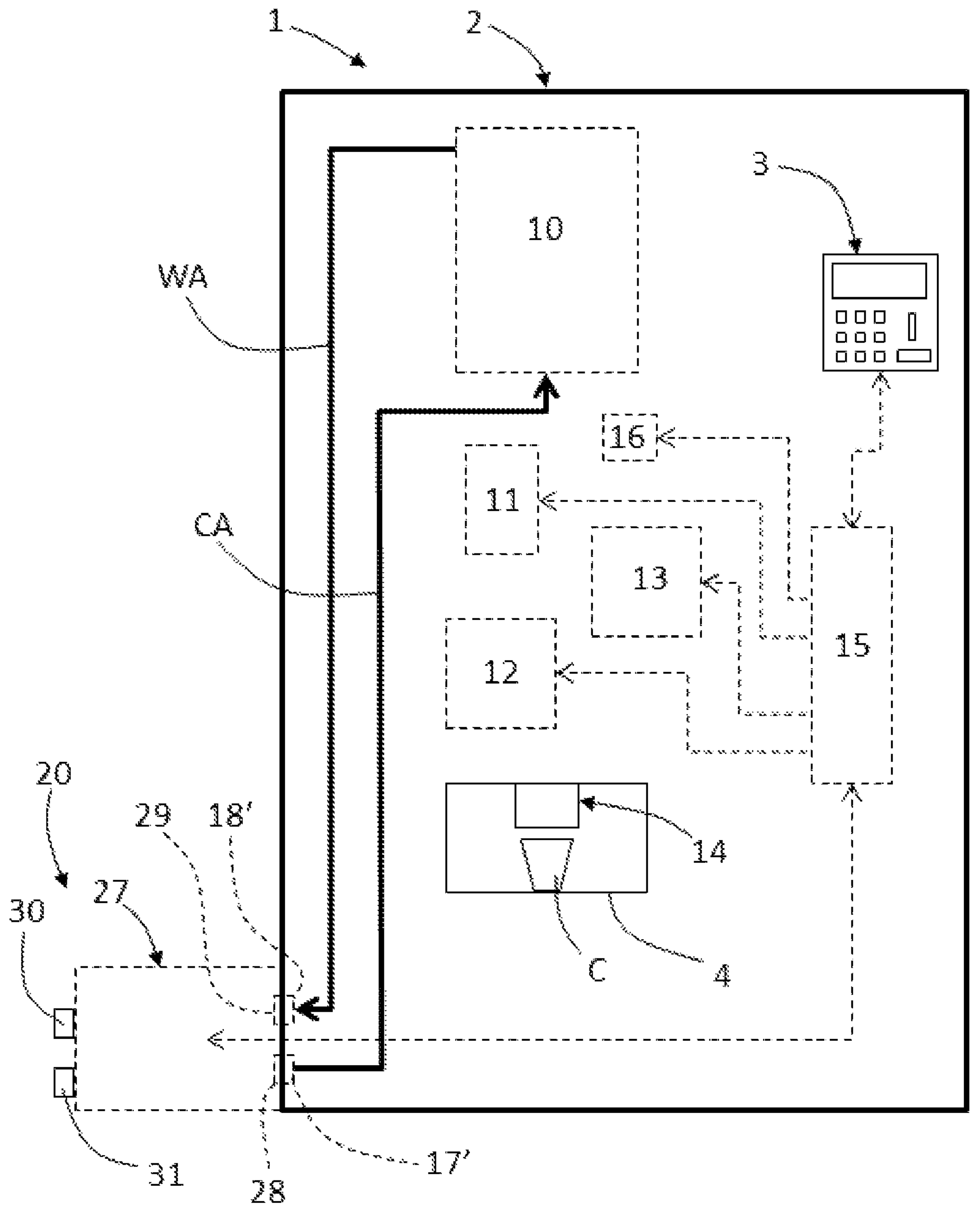
FIG. 8 is a schematic representation of a vending machine according to a possible variant embodiment of the invention.

As mentioned, the unit 20 could be placed outside the cabinet 2: such a case is exemplified in FIG. 8. In the example, the ducts CA and WA extending from the outlet 28 and the inlet 29 of the unit 20 will pass through in corresponding openings 17', 18' (or in a single opening) defined in a wall of the cabinet 2). The inlet 30 and the outlet 31 of the casing of the unit 20 can instead open directly onto the external environment.

It will be appreciated that the refrigeration unit 20, or more generally the cooling arrangement, can possibly also be exploited for the conditioning of other parts of the vending machine 1 inside the cabinet 2, for example in ways similar to those exemplified in FIGS. 2-7. Such an additional cooling may concern, for example, one or more volumes of containment of soluble substances (e.g., the volumes indicated with 10' in FIG. 1, preferably including containers similar to that indicated with 40), and/or a tank belonging to a drinking water dispenser (exemplified in 10" in FIG. 1), and/or the internal volume of the cabinet 2, and/or the same brewing unit 12 (although heated by the action of hot water during the dispensing of a beverage, in the unit 12 there may remain residues of ground coffee, for which a cooling can be advantageous for the same reasons as highlighted above in relation to the residues that may remain in the grinder 11).

As previously indicated, the problems underlying the invention can also occur in relation to beverage precursors other than coffee beans, such as precursors already in granular or powder form. The concepts of the invention are therefore also applicable for the cooling of one or more storage volumes for said different precursors that may are possibly arranged inside the vending machine cabinet, such as those schematically indicated with 10' in FIG. 1. In possible embodiments, in one and the same outer casing of the type previously indicated with 41 there could be housed a plurality of containers of the type previously indicated with 40, so as to define a single gap having functions of the gap indicated with 42, which surrounds at least in part each of said containers.

The invention claimed is:

1. A vending machine wherein ground coffee is used for preparing a coffee-based beverage, the vending machine comprising a cabinet in which there are housed:

a storage volume, for containing coffee beans, a grinder, set downstream of an outlet of the storage volume and designed to grind coffee beans coming from the storage volume, a brewing unit, set downstream of an outlet of the grinder and designed to receive an amount of ground coffee coming from the grinder, a supply arrangement, configured for supplying an extraction fluid, such as hot water, to the brewing unit, a dispensing arrangement of the coffee-based beverage, set downstream of an outlet of the brewing unit, at least a part of a cooling arrangement, configured for cooling the coffee beans contained in the storage volume, wherein the brewing unit is configured for preparing the coffee-based beverage via interaction between the amount of ground coffee and the extraction fluid, and the dispensing arrangement is designed to dispense the coffee-based beverage outside the cabinet, wherein the storage volume comprises an inner container, for receiving and storing the coffee beans, and said at least a part of the cooling arrangement comprises a first outer casing which at least partially surrounds the inner container, between the inner container and the first outer casing at least a part of a first gap being defined, having at least one inlet and at least one outlet, wherein the cooling arrangement further includes a refrigeration unit, having at least a first outlet for a flow of cooled air, connected via at least one first delivery duct to the at least one inlet of the first gap, and at least one first inlet for a flow of air to be cooled, connected via at least a first return duct to the at least one outlet of the first gap, wherein the cooling arrangement is configured to circulate the flow of cooled air through the first delivery duct, the first gap and the first return duct in a substantially closed air- circulation path, so that the flow of cooled air cools the inner container and the coffee beans contained therein indirectly, without being blown directly into the inner container or onto the coffee beans.

2. The vending machine according to claim 1, wherein the outer casing comprises a layer of insulating material.

3. The vending machine according to claim 1, wherein the at least one first inlet and the at least one first outlet of the first gap are in a lower region and in an upper region, respectively, of the first outer casing.

4. The vending machine according to claim 1, wherein the refrigeration unit comprises at least one electric fan configured for at least forcing cooled air into the first delivery duct, and for sucking air to be cooled from the first return duct.

5. The vending machine according to claim 1, wherein the cooling arrangement is further configured to cool at least one part of the grinder.

6. The vending machine according to claim 1, wherein the first outer casing also surrounds at least partially the grinder, to define a corresponding part of the first gap which surrounds at least partially the grinder, or else to define a volume in fluid communication with the first gap in which the grinder is at least partially housed.

7. The vending machine according to claim 5, wherein:

the cooling arrangement comprises a second casing which surrounds at least partially the grinder, the second casing delimiting at least part of a second gap having at least one respective inlet and at least one respective exit, and the refrigeration unit is configured for forcing cooled air to at least one inlet of the second gap and to receive air to be cooled from the at least one outlet of the second gap.

8. The vending machine according to claim 7, wherein the cooling arrangement comprises a second delivery duct and a second return duct connected to the at least one inlet and the at least one outlet of the second gap, respectively, and wherein:

the second delivery duct and the second return duct are formed by respective branches of the first delivery duct and the first return duct, respectively, or the refrigeration unit has a second outlet of cooled air, connected via the second delivery duct to the at least one second inlet of the second gap, and a second inlet of air to be cooled, connected via the second return duct to the at least one outlet of the second gap, or one of the second delivery duct and the second return duct is formed by a respective branch of the first delivery duct or the first return duct, respectively, and the other of the second delivery duct and the second return duct is connected to a second outlet of cooled air or to a second inlet of air to be cooled, respectively, of the refrigeration unit.

9. The vending machine according to claim 5, wherein the cooling arrangement is arranged to direct a further flow of cooled air onto said at least one part of the grinder.

10. The vending machine according to claim 1, further comprising a control unit in signal communication with at least one temperature sensor set inside the cabinet, the control unit being configured for controlling the refrigeration unit at least as a function of a temperature detected via the at least one temperature sensor, the at least one temperature sensor being positioned inside the cabinet in a region subject to cooling by the cooled air.

11. The vending machine according to claim 1, wherein:

the refrigeration unit is housed in the cabinet, and the cabinet has a ventilation inlet and a ventilation outlet, for dispersing heat produced by a condenser of the refrigeration unit, the refrigeration unit comprising an electric fan associated to the condenser, for sucking air from the environment outside of the cabinet via the ventilation inlet, for cooling the condenser, and for expelling in the environment outside the cabinet air heated by the condenser, via the ventilation outlet.

12. The vending machine according to claim 1, wherein the at least one first delivery duct and the at least one first return duct are each provided with an insulation layer.

13. The vending machine according to claim 1, wherein the first outer casing has an opening/closing element configured for allowing access to the inner container, for replacement or filling thereof.

14. The vending machine according to claim 1, wherein the cooling arrangement is further prearranged for cooling an internal volume of the cabinet and/or at least one further component or functional group set inside the cabinet.

15. A vending machine wherein at least one beverage precursor is used for the production of a beverage, the vending machine comprising a cabinet in which there are housed:

at least one storage volume, for containing the at least one beverage precursor, a brewing unit, set downstream of an outlet of the at least one storage volume and configured for receiving an amount of the at least one beverage precursor, a supply arrangement, configured to supply an extraction fluid, such as hot water, to the brewing unit, a dispensing arrangement of the beverage, set downstream of an outlet of the brewing unit, at least a part of a cooling arrangement, configured for cooling the at least one beverage precursor contained in the at least one storage volume, wherein the brewing unit is configured for preparing the beverage via the interaction between the amount of precursor and the extraction fluid, and the dispensing arrangement is configured for dispensing the beverage outside the cabinet, wherein the at least one storage volume comprises an inner container, for receiving and storing the at least one beverage precursor, and said at least a part of the cooling arrangement comprises a first outer casing which surrounds at least partially the inner container, between the inner container and the first outer casing at least a part of a first gap being defined, having at least one inlet and at least one outlet, wherein the cooling arrangement further includes a refrigeration unit, having at least a first outlet for a flow of cooled air, connected via at least one first delivery duct to the at least one inlet of the first gap, and at least a first inlet for a flow of air to be cooled, connected via at least a first return duct to the at least one outlet of the first gap, and wherein the cooling arrangement is configured to circulate the flow of cooled air through the first delivery duct, the first gap and the first return duct in a substantially closed air- circulation path, so that the flow of cooled air cools the inner container and the at least one beverage precursor contained therein indirectly, without being blown directly into the inner container or onto the at least one beverage precursor.

16. A vending machine wherein ground coffee is used for preparing a coffee-based beverage, the vending machine comprising a cabinet in which there are housed:

a storage volume, for containing coffee beans, a grinder, set downstream of an outlet of the storage volume and designed to grind coffee beans coming from the storage volume, a brewing unit, set downstream of an outlet of the grinder and designed to receive an amount of ground coffee coming from the grinder, a supply arrangement, configured for supplying an extraction fluid, such as hot water, to the brewing unit, a dispensing arrangement of the coffee-based beverage, set downstream of an outlet of the brewing unit, at least a part of a cooling arrangement, configured for cooling the coffee beans contained in the storage volume, wherein the brewing unit is configured for preparing the coffee-based beverage via interaction between the amount of ground coffee and the extraction fluid, and the dispensing arrangement is designed to dispense the coffee-based beverage outside the cabinet, wherein the storage volume comprises an inner container, for receiving and storing the coffee beans, and said at least a part of the cooling arrangement comprises a first outer casing which at least partially surrounds the inner container, between the inner container and the first outer casing at least a part of a first gap being defined, having at least one inlet and at least one outlet, wherein the cooling arrangement further includes a refrigeration unit, having at least a first outlet for a flow of cooled air, connected via at least one first delivery duct to the at least one inlet of the first gap, and at least one first inlet for a flow of air to be cooled, connected via at least a first return duct to the at least one outlet of the first gap, and wherein the refrigeration unit is positioned inside the cabinet.

17. A vending machine wherein at least one beverage precursor is used for the production of a beverage, the vending machine comprising a cabinet in which there are housed:

at least one storage volume, for containing the at least one beverage precursor, a brewing unit, set downstream of an outlet of the at least one storage volume and configured for receiving an amount of the at least one beverage precursor, a supply arrangement, configured to supply an extraction fluid, such as hot water, to the brewing unit, a dispensing arrangement of the beverage, set downstream of an outlet of the brewing unit, at least a part of a cooling arrangement, configured for cooling the at least one beverage precursor contained in the at least one storage volume, wherein the brewing unit is configured for preparing the beverage via the interaction between the amount of precursor and the extraction fluid, and the dispensing arrangement is configured for dispensing the beverage outside the cabinet, wherein the at least one storage volume comprises an inner container, for receiving and storing the at least one beverage precursor, and said at least a part of the cooling arrangement comprises a first outer casing which surrounds at least partially the inner container, between the inner container and the first outer casing at least a part of a first gap being defined, having at least one inlet and at least one outlet, wherein the cooling arrangement further includes a refrigeration unit, having at least a first outlet for a flow of cooled air, connected via at least one first delivery duct to the at least one inlet of the first gap, and at least a first inlet for a flow of air to be cooled, connected via at least a first return duct to the at least one outlet of the first gap, and wherein the refrigeration unit is positioned inside the cabinet.

18. The vending machine according to claim 15, wherein between the outlet of the at least one storage volume and an inlet of the brewing unit, a grinder is provided.

19. The vending machine according to claim 14, wherein said at least one further component or functional group is selected from the group consisting of the brewing unit, at least one storage volume of a substantially granular or powdery beverage precursor, and a tank belonging to a drinking water dispenser.

* * * * *